United States Patent [19]

Song

[11] Patent Number: 4,978,537
[45] Date of Patent: Dec. 18, 1990

[54] GRADUAL RELEASE STRUCTURES FOR CHEWING GUM

[75] Inventor: Joo H. Song, Skokie, Ill.

[73] Assignee: Wm. Wrigley Jr. Company, Chicago, Ill.

[21] Appl. No.: 340,384

[22] Filed: Apr. 19, 1989

[51] Int. Cl.⁵ ............................................. A23G 3/30
[52] U.S. Cl. .......................................... 426/5; 426/96; 426/97; 426/99; 426/548; 426/658; 426/303; 426/307; 426/310
[58] Field of Search .................. 426/96, 97, 99, 3–6, 426/548, 658, 303, 307, 310

[56] References Cited

U.S. PATENT DOCUMENTS

| | | | |
|---|---|---|---|
| 3,028,308 | 4/1962 | Zambito et al. | 167/82 |
| 3,201,353 | 8/1965 | Corben | 252/316 |
| 3,329,574 | 7/1967 | Barron et al. | 167/82 |
| 3,435,110 | 3/1969 | Nichols | 424/20 |
| 3,737,521 | 6/1975 | Born | 424/22 |
| 3,795,744 | 3/1974 | Ogawa et al. | 426/3 |
| 3,818,107 | 6/1974 | Yolles | 426/3 |
| 3,923,939 | 12/1975 | Baker | 264/49 |
| 3,928,633 | 12/1975 | Shoat et al. | 426/96 |
| 3,951,821 | 4/1976 | Davidson | 252/1 |
| 4,122,195 | 10/1978 | Bahoshy et al. | 426/3 |
| 4,125,519 | 11/1978 | Goodman et al. | 528/363 |
| 4,139,639 | 2/1979 | Bahoshy et al. | 426/3 |
| 4,206,301 | 6/1980 | Yolles | 536/3 |
| 4,230,687 | 10/1980 | Sair et al. | 424/22 |
| 4,374,858 | 2/1983 | Glass et al. | 426/5 |
| 4,384,004 | 5/1983 | Cea et al. | 426/3 |
| 4,384,005 | 5/1983 | McSweeney | 426/250 |
| 4,386,106 | 5/1983 | Merritt et al. | 426/5 |
| 4,388,328 | 6/1983 | Glass | 426/3 |
| 4,447,475 | 5/1984 | Lubbock et al. | 427/213.31 |
| 4,485,118 | 11/1984 | Carroll et al. | 426/5 |
| 4,496,592 | 1/1985 | Kiwahara | 426/5 |
| 4,515,769 | 5/1985 | Merritt et al. | 424/49 |
| 4,568,560 | 2/1986 | Schobel | 427/3 |
| 4,590,075 | 5/1986 | Wei et al. | 426/5 |
| 4,606,940 | 8/1986 | Frank et al. | 427/213.32 |
| 4,634,593 | 1/1987 | Stroz et al. | 426/5 |
| 4,673,565 | 6/1987 | DiLuccio et al. | 424/443 |
| 4,673,577 | 6/1987 | Patel | 426/5 |
| 4,690,825 | 9/1987 | Won | 424/501 |
| 4,695,463 | 9/1987 | Yang et al. | 424/440 |
| 4,711,784 | 12/1987 | Yang | 426/5 |
| 4,720,384 | 1/1988 | DiLuccio et al. | 424/78 |
| 4,722,845 | 2/1988 | Cherukuri et al. | 426/5 |
| 4,726,953 | 2/1988 | Carroll et al. | 426/5 |
| 4,740,376 | 4/1988 | Yang | 426/5 |
| 4,752,485 | 6/1988 | Sharma et al. | 426/99 |
| 4,766,036 | 8/1988 | Vaughn et al. | 428/364 |

FOREIGN PATENT DOCUMENTS

| | | |
|---|---|---|
| 252374 | 1/1988 | European Pat. Off. . |
| 0273009 | 6/1988 | European Pat. Off. . |
| 0288909 | 11/1988 | European Pat. Off. . |
| 1327761 | 8/1977 | United Kingdom . |

*Primary Examiner*—Jeanette Hunter
*Attorney, Agent, or Firm*—Willian Brinks Olds Hofer Gilson & Lione

[57] ABSTRACT

Gradual release structures for the release of active agents in chewing gum and a process for making such structures are provided. The gradual release structures are formed by meltspinning techniques and comprise an active agent and a wall material.

27 Claims, 6 Drawing Sheets

GRADUAL RELEASE STRUCTURES FOR CHEWING GUM

FIELD OF THE INVENTION

The invention is related to delivery systems for the gradual release of active agents and processes for making such systems and is particularly directed to delivery systems for use in chewing gum that have an active agent that is gradually released by direct interaction with a solvent and melt spinning processes for making such systems.

BACKGROUND OF THE INVENTION

The present invention is an advance in the art of delivery systems for the gradual release of active agents. This invention enables an active agent to be gradually released through the direct interaction of the agent and a solvent either within channels in the structure enclosing the active agent or through exposure of the active agent to the solvent when the structure enclosing the active agent is deformed.

Prior to the present invention, the gradual release of active agents, such as drugs, could be accomplished by the diffusion of the active agent through an encapsulating material. A discussion of such encapsulated structures is found in R. Dunn & D. Lewis, *Fibrous Polymers for the Delivery of Contraceptive Steroids to the Female Reproductive Tract,* Controlled Release of Pesticides and Pharmaceuticals 125–46 (D. Lewis ed. 1981), which describes fiber-like structures. Alternatively, an encapsulating shell around the active agent could be ruptured causing exposure of the active agent to various solvents.

SUMMARY OF THE INVENTION

A particular feature of this invention is to provide a gradual release structure having an active agent that is gradually released through direct interaction with a solvent. A further feature of this invention is to provide a novel process for making such structures using melt spinning techniques.

According to the invention a chewing gum is provided which comprises a gradual release structure. The gradual release structure is formed by melt spinning a mixture of active agent and wall material, having more than zero but less than about 55 percent by weight active agent, into a fiber. If necessary, the fiber is then stretched. The fiber is cut. A process for making chewing gum is further provided which comprises the steps of preparing a gum base, preparing a water soluble bulk portion, and preparing a gradual release structure. The gradual release structure is made by preparing a mixture of active agent and wall material, having more than zero but less than about 55 percent by weight active agent. This mixture is melt spun into a fiber which is cut. The gradual release structure, the gum base, and the water soluble bulk portion are combined.

To aid in understanding the invention one is directed towards the drawings and the detailed description of the present preferred embodiment of the invention.

DETAILED DESCRIPTION OF PRESENTLY PREFERRED EMBODIMENT OF THE INVENTION

An embodiment of a structure made in accordance with the present invention is a fiber having a support matrix. The support matrix is made up of a wall material. An active agent is dispersed throughout the support matrix and may be in contact with itself forming a contiguous phase within the support matrix. The active agent, however, does not necessarily have to be in a contiguous phase. The ends of the support matrix have openings, exposing the active agent. Additionally, the active agent may be exposed along the sides of the fiber. This structure may be made by stretching an already formed fiber. It is believed that the stretching action causes the wall material to orient itself longitudinally. The amount of active agent in this structure is from about 10 percent by weight to about 55 percent by weight. It is believed, however, that loading as low as a fraction of a percent will exhibit gradual release characteristics. The loading of the structure is influenced by the characteristics of the active agent and the solubility or extractability from the support matrix.

After the fibers are formed by melt spinning they may be stretched by applying a draw, or stretching force, to the fibers. The draw can be applied at a winder or by venturi after the fibers exit the die. Other methods of stretching fibers known to the art may also be employed.

In this structure gradual release of the active agent occurs when the fiber is brought in contact with a solvent, or dispersing media, for the active agent. The wall material is less soluble in the solvent then the active agent and preferably the wall material should be substantially insoluble in the solvent under the conditions in which the fiber is being used.

It is presently believed that the solvent first dissolves the active agent in the openings at the ends of the support matrix. If the active agent is in a contiguous phase within the support matrix, the active agent in those openings is dissolved and spaces or channels in the support matrix are created. The solvent fills these channels and begins to dissolve the newly exposed active agent, which was in contact with the now dissolved active agent located in the openings at ends of the support matrix. Thus, the length of the channels in the support matrix gradually increases as the active agent directly in contact with the solvent is dissolved.

It is presently believed that the support matrix does not prevent the dissolution of the active agent because the active agent is in a contiguous phase. Rather, the support matrix serves to limit the rate of dissolution by restricting the area of active agent in direct contact with the solvent to the ends of the channels within the support matrix. Thus, the solvent can gradually work its way into the fiber by following the contiguous phase of active agent.

Additionally, it is presently believed that depending on the stiffness of the wall material making up the support matrix, the support matrix can be deformed to expose new surface areas of active agent and thus bring them in direct contact with the solvent. For instance, when fibers are incorporated into chewing gum as the gum is chewed the pressure from chewing will flatten, stretch, and deform the fibers exposing new surface areas of active agent to the solvent. This gradual release by deformation should occur even if the active agent is not in a contiguous phase. Higher molecular weight polymers used as wall material will not as readily exhibit this gradual release by deformation. For instance, it is believed that polyvinylacetate having a molecular weight greater than about 100,000 will not exhibit gradual release by deformation during gum chewing.

Furthermore, it is theorized that if the active agent is not in a contiguous phase the deformation of the support matrix may create channels, similar to those described above, through which the solvent can be brought in contact with the active agent.

Finally, depending on the wall material chosen, the active agent chosen, and the solvent being used an extremely small amount of the active agent may dissolve by diffusion through the wall material.

Figure 1:
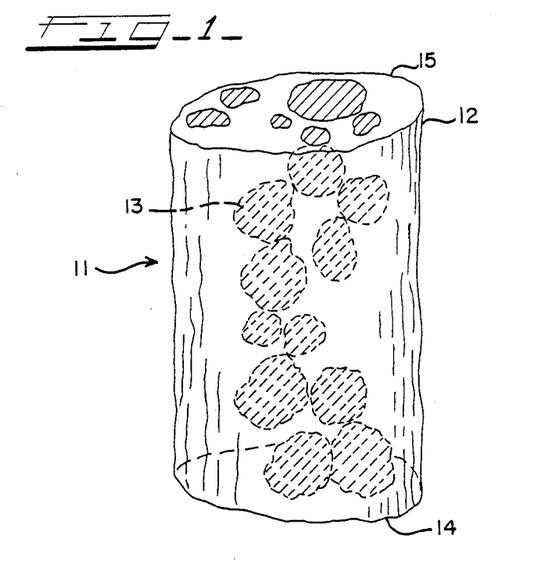
FIG. 1 is an illustration of a gradual release structure in fiber form.
Figure 2:
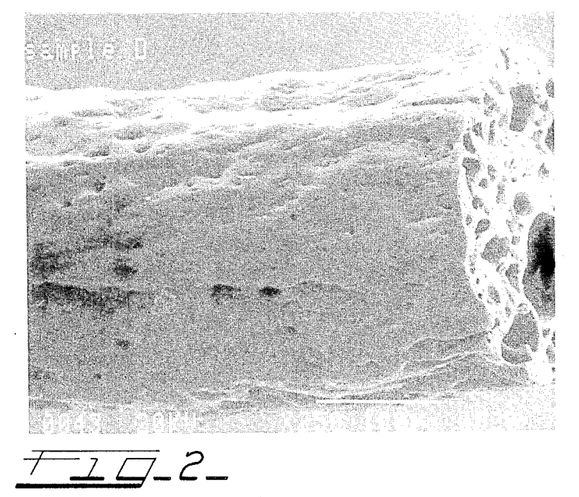
FIG. 2 is a Scanning Electron Photomicrograph (SEPM) of a gradual release structure showing the end and side of a fiber.
Figure 3:
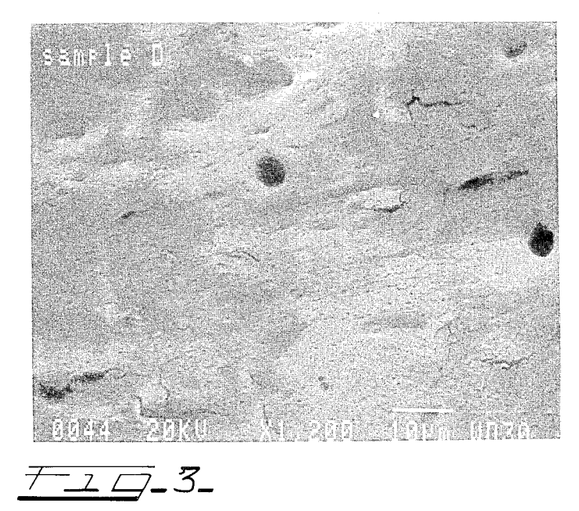
FIG. 3 is a SEPM of a gradual release structure showing the side of a fiber.

Another embodiment of a gradual release structure made in accordance with the present invention is illustrated in FIG. 1. In this embodiment the structure is in the form of a fiber 11 having a support matrix 12. The support matrix is made up of a wall material. An active agent 13 is dispersed throughout the support matrix and is in contact with itself forming a contiguous phase within the support matrix. The ends 14 and 15 of the support matrix have openings, exposing the active agent. Additionally, the active agent may be exposed along the sides of the fiber as can be seen in FIGS. 2 and 3. The active agent makes up at least about 25 percent of the structure by weight.

Figure 1A:
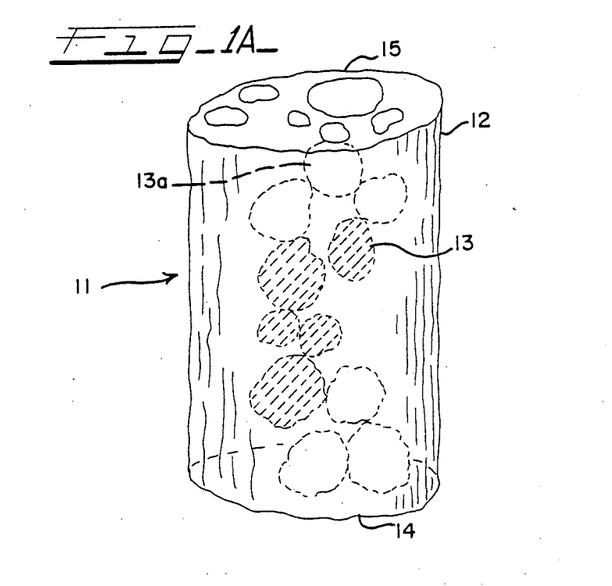
FIG. 1A is an illustration of the gradual release structure of FIG. 1 after it has been subjected to a solvent.

Gradual release of the active agent in this embodiment occurs when the fiber is brought in contact with a solvent, or dispersing media, for the active agent. The wall material is less soluble in the solvent then the active agent and preferably the wall material should be substantially insoluble in the solvent under the conditions in which the fiber is being used. As illustrated in FIG. 1A, the solvent first dissolves the active agent in the openings at the ends 14 and 15 of the support matrix. As this material is dissolved spaces or channels 13a in the support matrix are opened. The solvent fills these channels and begins to dissolve the newly exposed active agent, which was in contact with the now dissolved active agent located in the openings at ends of the support matrix. Thus, the length of the channels in the support matrix gradually increase as the active agent directly in contact with the solvent is dissolved.

It is presently believed that the support matrix does not prevent the dissolution of the active agent because the active agent is in a contiguous phase. FIG. 1 and 1A. Rather, the support matrix serves to limit the rate of dissolution by restricting the area of active agent in direct contact with the solvent to the end of the channels within the support matrix. Thus, the solvent can gradually work its way into the fiber by following the contiguous phase of active agent. Additionally, depending on the wall material chosen, the active agent chosen, and the solvent being used a small amount of the active agent may dissolve by diffusion through the wall material. Gradual release by deformation may also be exhibited by this structure.

Figure 4:
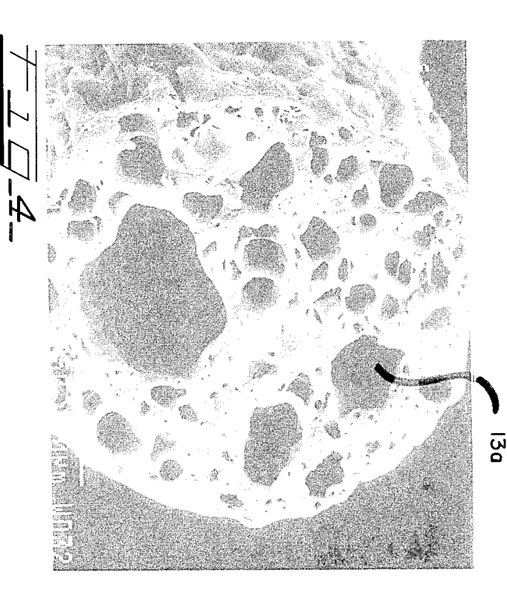
FIGS. 4 & 5 are SEPMs of a gradual release structure showing the ends of a fiber and the channels within the encapsulating structure.
Figure 5:
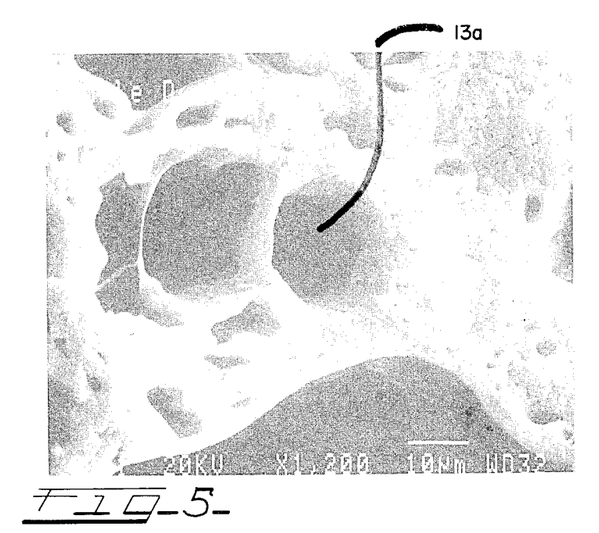
Figure 6:
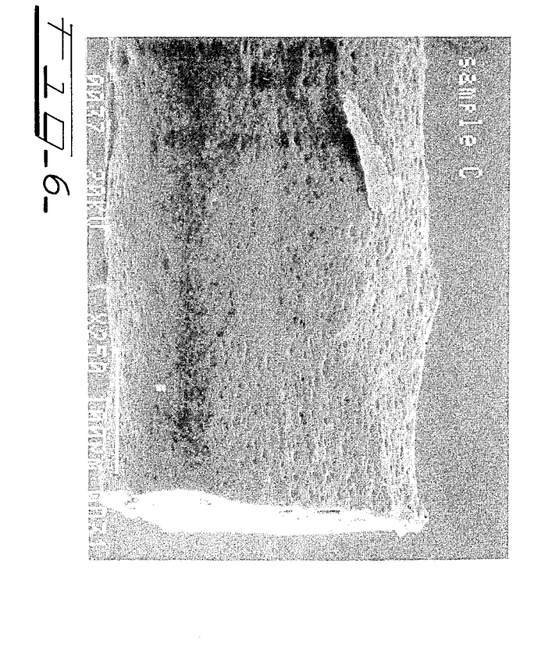
FIG. 6 is an SEPM showing the side and end of a fiber.
Figure 7:
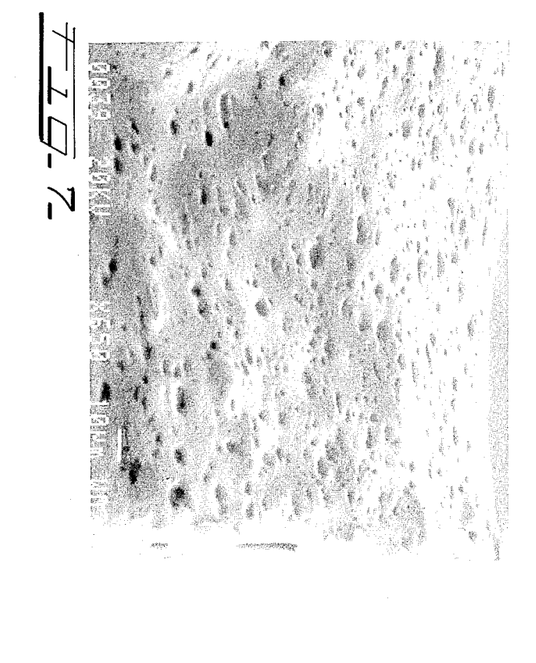
FIG. 7 is a SEPM showing the side of a fiber.

FIGS. 4 and 5 contain SEPMs of fibers made in accordance with the present invention. These fibers were subjected to a solvent. The spaces or channels 13a where the active agent was dissolved out are shown in these SEPMs.

The active agent can be any material such as artificial sweeteners, powdered flavor oil, or drugs, which the gradual release of may be desired. They must be solid or in the form of powders, including liquids encapsulated by spray drying techniques or liquids adsorbed or absorbed into or onto a supporting matrix, i.e., silica, zeolite, carbon black, or porous matrices. Combinations of different active agents in the same structure may also be employed. For purposes of illustration, possible active agents may be: high intensity sweeteners, such as aspartame, alitame, acesulfam-k and its salts, saccharin and its salts, thaumatin, sucralose, cyclamic acid and its salts, monellin, and dihydrochalcones; acidulents, such as malic acid, citric acid, tartaric acid, and fumaric acid; salt, such as sodium chloride and potassium chloride; bases, such as, magnesium hydroxide and urea; flavors, such as spray dried natural or synthetic adsorbed onto silica, and absorbed into maltodextrin; flavor modifiers, such as thaumatin; breath fresheners, such as zinc chloride, encapsulated menthol, encapsulated anise, zinc glucinate, and encapsulated chlorophyll; and medicaments.

Care must be taken to avoid the degradation of the active agent from high temperatures, shear, or other conditions, which may occur during formation. The wall material can be any spinnable synthetic or nature polymer such as polyethylene, polyvinylacetate, polyesters, chitosan, and copolymers and polymer blends of these polymers. The active agent and wall material must meet the solubility requirements discussed above. Additionally, they must be immiscible with each other and capable of being uniformly dispersed when mixed together during the melt spinning procedure.

The gradual release structures of the present invention can be used in chewing gum. Chewing gum consists of a gum base to which a water soluble bulk portion may normally be added.

Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, a copolymer form Exxon Corp. under the designation "butyl rubber," and the like.

The amount of elastomer used in the gum base can typically be varied between about 10 and about 20 percent depending on the specific elastomer selected and on the physical properties desired in the final gum base.

For example, the viscosity, softening point, and elasticity can be varied.

Resins used in gum bases may include polyvinylacetate, polyethylene, ester gums, (resin esters of glycerol), polyvinylacetate polyethylene copolymers, polyvinylacetate polyvinyl laurate copolymers, and polyterpenes. Additionally, a polyvinylacetate obtained from Monsanto under the designation "Gelva" and a polyterpene obtained from Hercules under the designation "Piccolyte" may be used.

As with the elastomer, the amount of resin used in the gum base can be varied depending on the particular resin selected and on the physical properties desired in the final gum base.

Preferably, the gum base also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. Additionally, mixtures of the plasticizers may be used such as a mixture of paraffin wax, partially hydrogenated vegetable oil, and glycerol monostearate.

Preferably, the gum base also includes a filler component. The filler component is preferably selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants, colors, and emulsifiers.

These ingredients of the gum base can be combined in a conventional manner. In particular, the elastomer, resins, plasticizers, and the filler are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the gum base portion is retained in the mouth throughout the chew.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Nonsugar sweeteners can include sorbitol, mannitol, and xylitol.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. The flavoring agent is typically added with the final portion of the bulking agent.

The entire mixing procedure typically takes about fifteen minutes, but longer mixing times may sometimes be required. Those skilled in the art will recognize that many variations of the above described procedure may be followed.

Gradual release structures that embody the present invention are made by melt spinning a uniform mixture of active agent and wall material into a fiber. The general principles for melt spinning polymers are well known in the art and are described in F. Billmeyer, Jr., *Text Book of Polymer Science*, 518-22 (Wiley International Edition, 2nd), which is incorporated herein by reference. In this process a mixture of a polymer for the wall material and an active agent are prepared in powder or pellet form. The particles of polymer and active agent are mixed together into a homogeneous phase. The concentration of active agent in this mixture is such that the particles of active agent may be in contact with each other. The mixture is melt spun to produce fibers. These fibers are then gently broken into smaller sizes. Any grinding machine or knife which reduces the length of fiber without excessively damaging the support matrix is suitable. Fiber brittleness eases the cutting process of the fiber and can be achieved by concentrating the solid active agent particles. To avoid the detection of the fibers when chewing the gum, fibers of a size such that they can pass through a 60 mesh screen are used.

The fact that a polymer or polymer blend initially shows an unacceptably high pressure for extrusion, does not automatically eliminate the possibility of using it in this process. Processability often can be improved by increasing the processing temperature, introducing plasticizers, changing nozzle dimensions, adding dispersing agents, or modifying it by blending with other polymers.

By way of example, this process was carried out on two types of equipment.

Model 1125 Instron Capillary Rheometer

A Model 1125 Instron Capillary Rheometer, with capillary hole diameter of 152 microns was used to extrude fibers. The barrel diameter was 3/8 inches. The die had a Length to diameter ratio of 0.083 and had 1 hole. In this application of the process L-aspartyl-L-phenylalanine methyl ester (Aspartame) was used as the active agent. A polyvinylacetate (PVAc) having a molecular weight from about 50,000 to 80,000 was chosen as the wall material.

This laboratory scale Capillary Rheometer could not provide enough mixing action during extrusion. Thus, prior to extrusion, samples were pre-blended by two methods. In one method, PVAc was dissolved in Methylene Chloride ($CH_2Cl_2$) at room temperature, and then Aspartame was mixed into this solution. The solvent was evaporated overnight under vacuum at 60° C. to form a solid material. This material was ground to a powder to facilitate addition into the rheometer.

This method is indicated in Table 1 as "Solution Blended." In the other method, samples were prepared for extrusion by directly blending the Aspartame with a polymer melt of the wall material in a heated beaker at 140° C. The blend was dried under vacuum at 60° C. for about 5 hours to remove water. This method is indicated in Table 1 as "Melt Blended."

Using these two methods of mixing the wall material and the active agent, fibers with varying amounts of Aspartame were produced. The parameters used for these examples are set out in the following Table 1. The Jet Speed is the speed of the material being meltspun in the capillary.

TABLE 1

|  | Temp. | Jet Speed (m/min) | Extrusion Load (kgf) |
|---|---|---|---|
| Example 1 |  |  |  |
| Aspartame | 140° C. | 5 | 13 |
| 17 wt. % |  | 10 | 18 |
| in PVAc |  | 20 | 32 |
| (Solution Blended) |  | 50 | 57 |
|  |  | 100 | 76 |
| Example 2 |  |  |  |
| Aspartame | 150° C. | 5 | 18 |
| 17 wt. % |  | 10 | 23 |
| in PVAc |  | 20 | 34 |
| (Solution Blended) |  | 50 | 51 |
|  |  | 100 | 68 |
| Example 3 |  |  |  |
| Aspartame | 140° C. | 5 | 41–59 |
| 17 wt. % |  | 10 | 23–68 |
| in PVAc |  | 20 | 45–113 |
| (Melt Blended) |  | 50 | 68 |
| Example 4 |  |  |  |
| Aspartame | 140° C. | 5 | 13 |
| 29 wt. % |  | 10 | 16 |
| in PVAc |  | 20 | 20 |
| (Solution Blended) |  | 100 | 52 |
| Example 5 |  |  |  |
| Aspartame | 150° C | 5 | 9 |
| 29 wt. % |  | 10 | 13 |
| in PVAc |  | 20 | 17 |
| (Solution Blended) |  | 50 | 25 |
|  |  | 100 | 36 |
|  |  | 200 | 50 |
|  |  | 500 | 59 |
| Example 6 |  |  |  |
| Aspartame | 140° C. | 5 | 32 |
| 29 wt. % |  | 10 | 45 |
| in PVAc |  | 20 | 90–180 |
| (Melt Blended) |  | 50 | less than 180 |
| Example 7 |  |  |  |
| Aspartame | 140° C. | 5 | 14 |

TABLE 1-continued

|  | Temp. | Jet Speed (m/min) | Extrusion Load (kgf) |
|---|---|---|---|
| 35 wt. % |  | 10 | 17 |
| in PVAc |  | 20 | 25 |
| (Solution Blended) |  | 50 | 36 |
| Example 8 |  |  |  |
| Aspartame | 140° C. | 5 | 10 |
| 35 wt. % |  | 10 | 12 |
| in PVAc |  | 20 | 18 |
| (Solution Blended) |  | 50 | 27 |
|  |  | 100 | 41 |
|  |  | 200 | 55 |
| Example 9 |  |  |  |
| Aspartame | 140° C. | 5 | 36–41 |
| 35 wt. % |  | 10 | 54–64 |
| in PVAc |  | 20 | 113–136 |
| (Melt Blended) |  | 50 | 272–363 |

Table 1, shows that the spinnability of PVAc blends was good and not highly dependent on the Aspartame loading level. The extrudates of PVAc/Aspartame blends shown in Table 1 were brittle at 17% Aspartame loading. Brittleness increased as the Aspartame loading level increased. The diameter of the extruded fibers due to die swell was slightly larger than the capillary, which was 152 microns.

The extruded fibers were gently ground with a mortar and pestle. The diameter to length ratio of these ground fibers was narrowly distributed with no major breakage of fibers along the longitudinal direction.

Figure 8:
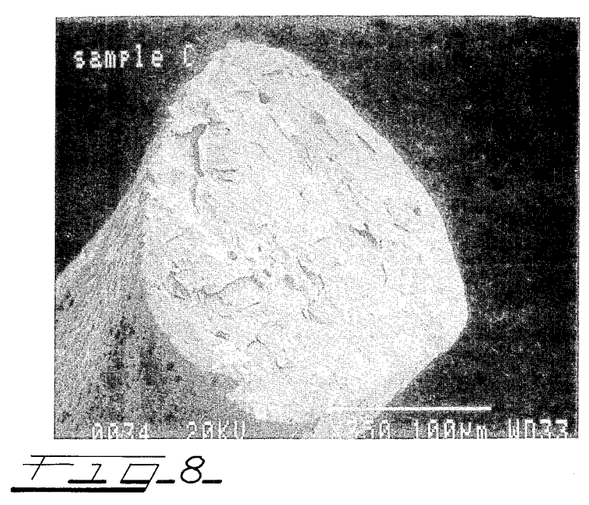
FIGS. 8 & 9 are SEPMs showing the ends of a fiber.
Figure 9:
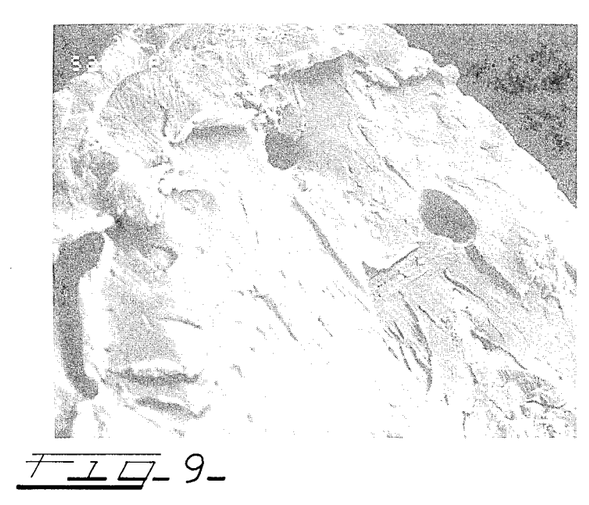

FIGS. 2 through 5 are SEPMs of fibers having 29% by weight Aspartame in PVAc that were prepared by the solution blending technique described above and extruded at 150° C. FIGS. 6 through 9 are SEPMs of fibers having 17% by weight Aspartame in PVAc that were prepared by the melt blending technique described above and extruded at 140° C. Both samples were extracted with water as the solvent for four hours. The spaces shown in the SEPMs are places from which Aspartame was dissolved. FIGS. 8 and 9 show that at 17% loading, the solid particles of Aspartame are isolated in polymer. Thus, Aspartame could not completely dissolve out into the water without further physical breaking of the polymeric structure. At 29% loading, FIGS. 4 and 5, however, the solid particles of Aspartame formed a contiguous phase as illustrated in FIG. 1. Thus, channels in the encapsulating structure were opened and the Aspartame was gradually released, until virtually none remained.

This result is demonstrated by chew out data given in Table 2. Chewing gums having a formulation of:

| Ingredient | % by weight |
|---|---|
| Sorbitol | 49.5 |
| Stick Gum Base | 25.5 |
| Syrup | 9.1 |
| Mannitol | 8.0 |
| Glycerine | 6.3 |
| Lecithin | 0.2 |
| Flavor (Peppermint) | 1.4 | were prepared with fibers having 17% loading and 29% loading. The syrup in the gum consisted of 67% by weight Lycasin solids, 5.36% by weight water, and 27.14% by weight glycerin. A control gum was prepared using the above formulation with the addition of free Aspartame instead of the fibers. The gums were then chewed by five volunteers. Gum cuds were collected at different chewing times and Aspartame concentration was analyzed by High Performance Liquid Chromatography.

TABLE 2

| Type of fiber used in gum | % Aspartame in Gum After: | | | |
|---|---|---|---|---|
| | 0 min. | 5 min. | 10 min. | 20 min. |
| Control | 0.18 | 0.11 | 0.06 | 0.02 |
| Aspartame/PVAc 17% by wt. | 0.11 | 0.10 | 0.11 | 0.10 |
| Aspartame/PVAc 29% by wt. | 0.18 | 0.15 | 0.14 | 0.12 |

The control gums contain free Aspartame. The PVAc/Aspartame gums (17% by wt. Aspartame) contained fibers of the type shown in FIGS. 6 through 9. The PVAc/Aspartame gums (29% by wt. Aspartame) contained fibers of the type shown in FIGS. 2 through 5. As shown in Table 2 the release rate of Aspartame from the fiber loaded at 17% was much slower than the release rate from the fiber loaded at 29%. The release rate of Aspartame from the fiber loaded at 29% is significantly slower than the control, but faster than the 17% sample.

Liquid Chromatography analysis was carried out on the fibers spun at 140° C. and at 150° C. in examples 1 through 9 to determine the amount of thermal degradation of Aspartame occurring during the melt spinning process discussed above. At 140° C. thermal degradation of Aspartame is less than 10%. At 150° C. the percent thermal degradation of Aspartame approached 20%.

The residence time of Aspartame/polymer blend in the Capillary Rheometer used to prepare the above samples was about twenty minutes. In production scale spinning, residence time could be reduced to around 20 seconds to two minutes. This would greatly reduce the degree of Aspartame degradation. At 90°–100° C. using a twin screw extruder at 2 minutes residence time, no degradation is observed.

Twin Screw Extruder

In Examples 10–23 a type LSM 30:34 twin screw extruder from American Leistritz Extruder Corporation was used to produce the fibers. Generally, a homogeneous mixture of wall material and active agent in powdered form were poured into a hopper on the extruder. The hopper feed screws which forced the mixture through heated sections of the extruder, melting the polymer, and then through a die. The die consists of a plurality of holes having a specific diameter and length. Upon leaving the die the fibers were stretched by either drawing them with a winder or by blowing air past them with a venturi.

The twin screw extruder consisted of two sets of eight element screws. These screws can operate in an intermeshing fashion in either a co-rotational or a counter rotational mode. These screws can function as kneading elements or conveying elements. For the following examples four kneading elements alternating with four conveying elements were used. Other configurations are possible and will depend on the process conditions and the types of materials being melt spun and the degree of mixing required.

The twin screw extruder used in the following examples was divided into eight zones. The temperature of each zone was controlled. For example, a mixture of 50 percent by weight PVAc with a molecular weight of about 30,000, 25 percent by weight PVAc with a molecular weight of about 15,000, and 25 percent by Aspartame was melt spun to produce fibers. Operating the extruder with a 1 mm die having 5 holes at 30 rpm, resulted in the production of 5 pounds of fiber per hour. The following temperatures in degrees centigrade were used for each zone:

| Zone | Temp. |
|---|---|
| Feeding or hopper zone | 85 |
| 2 | 95 |
| 3 | 95 |
| 4 | 95 |
| 5 | 95 |
| 6 | 95 |
| 7 | 95 |
| Die or last zone | 102 |

Operating the extruder with a 1 mm die having 5 holes at 333 rpm, resulted in the production of 50 pounds of fiber per hour. The following temperatures in degrees centigrade were used for each zone:

| Zone | Temp. |
|---|---|
| Feeding or hopper zone | 85 |
| 2 | 97 |
| 3 | 97 |
| 4 | 97 |
| 5 | 97 |
| 6 | 97 |
| 7 | 97 |
| Die or last zone | 102 |

In the following examples dies having a diameter of 1 mm and 0.3 were used. The 1 mm die had 5 holes and had a diameter to length ratio of about 4. The 0.3 mm die had 34 holes and had a diameter to length ratio of 2:3. The temperatures set out in these examples were taken from an average of all heating zones on the extruder.

EXAMPLE 10

Using a 1 mm die, fibers having 10% by weight Acesulfam-K (a high intensity sweetener purchased from Hoecht, of W. Germany) as the active agent and having PVAc with a molecular weight of about 50,000–80,000 as the wall material were extruded at 110°–115° C. The fibers were drawn by a winder and had a thickness of 0.2–0.3 mm. The Acesulfam-K particles dispersed very well in the fibers and the fibers exhibited a gradual release of the active agent when chewed alone.

EXAMPLE 11

Using a 1 mm die, fibers having 25% by weight Acesulfam-K as the active agent and having PVAc with a molecular weight of about 50,000–80,000 as the wall material were extended at 110° C. The fibers were drawn by a winder. The fibers were between 0.3–0.4 mm in thickness. The Acesulfam-K particles dispersed very well in the fibers and the fibers exhibited a gradual release of the active agent when chewed alone.

EXAMPLE 12

Using a 1 mm die, fibers having 10% by weight Aspartame as the active agent and having PVAc with a molecular weight of about 50,000–80,000 as the wall material were extended at 100° C. The fibers were drawn by a winder and had a thickness of 0.2–0.3 mm. The Aspartame dispersed very well in the fibers and the fibers exhibited a gradual release of the active agent when chewed alone.

EXAMPLE 13

Using a 1 mm die, fibers having 10% by weight Aspartame as the active agent and having PVAc with a molecular weight of about 50,000-80,000 as the wall material were extruded at 100° C. The fibers were drawn by the winder and had a thickness of about 0.2 mm. The Aspartame dispersed very well in the fibers and the fibers exhibited an excellent gradual release of the active agent when chewed alone.

EXAMPLE 14

Using a 1 mm die, fibers having 35% by weight Sodium Saccharin as the active agent and having PVAc with a molecular weight of about 50,000-80,000 as the wall material were extruded at 100° C. The fibers were drawn at the winder and were 0.4-0.5 mm thick. The Sodium Saccharin dispersed very well in the fibers, although the fibers were softer than those of examples 10-13. The fibers exhibited a gradual release of the active agent when chewed alone.

EXAMPLE 15

Using a 1 mm die, fibers having 35% by weight Saccharin Acid as the active agent and having PVAc with a molecular weight of about 50,000-80,000 as the wall material were extruded at 100° C. The fibers were drawn at the winder and were 0.4-0.5 mm thick. The Saccharin Acid dispersed very well in the fiber, although the fibers were softer than those of examples 10-13. The fibers exhibited a gradual release of the active agent when chewed alone.

EXAMPLE 16

Using a 1 mm die, fibers having 6.13% by weight NaCl, 3.87% by weight KCl as the active agents and having PVAc with a molecular weight of about 30,000 as the wall material were extruded at 113° C. The fibers were drawn at the winder and were 0.12 mm in thickness. The NaCl and KCl particles were dispersed in the fiber. The fibers exhibited good gradual release of the active agent when chewed alone.

EXAMPLE 17

Using a 1 mm die, fibers having 6.13% by weight NaCl, 3.87% by weight KCl as the active agents and having PVAc with a molecular weight of about 15,000 as the wall material were extruded at 90° C. The fibers were drawn by air blowing and were 0.12 mm in thickness and were slightly weaker than the fibers of Example 16. The fibers exhibited a gradual release of the active agent when chewed alone.

EXAMPLE 18

Using a 1 mm die, fibers having 24.52% by weight NaCl, and 15.48% KCl by weight as the active agents and having Allied Chemical PE 735 as the wall material were extruded at 85°-90° C. The fibers were 0.96 mm thick and were drawn by air blowing. The fibers exhibited gradual release of salts.

EXAMPLE 19

Using a 1 mm die, fibers having 25% by weight Diamonium Phosphate as the active agent and having PVAc with a molecular weight of about 50,000-80,000 as the wall material were extruded at 100° C. The fibers were drawn by air blowing and had a thickness of 0.20-0.38 mm.

EXAMPLE 20

Using a 1 mm die, fibers having 25% by weight NaF as the active agent and having PVAc with a molecular weight of 50,000-80,000 were extruded at 90°-100° C. The fibers were drawn by air blowing and had a thickness of 0.18-0.25 mm.

EXAMPLE 21

Using a 1 mm die, fibers having 25% by weight Mg(OH)$_2$ as the active agent and having PVAc with a molecular weight of about 50,000-80,000 as the wall material were extruded at 90°-100° C. The fibers were drawn by air blowing and had a thickness of 0.25 mm.

EXAMPLE 22

Using a 1 mm die, fibers having 25% by weight Acesulfam-K as the active agent and having PVAc with a molecular weight of about 30,000 as the wall material were extruded at 90°-100° C. The fibers were drawn by air blowing and had a thickness of 0.13 mm. The fiber exhibited the best release characteristics of the examples.

EXAMPLE 23

Using a 0.3 mm die, fibers having 25% by weight Aspartame as the active agent and having PVAc with a molecular weight of about 50,000-80,000 as the wall material were extruded at 90°-100° C. In making the fibers of this example prior to extrusion the PVAc and Aspartame were premixed in methylene chloride, following the solution blended method described above. The fibers were drawn by a winder and had a thickness of 0.127 mm.

Gradual release fibers having the same formulation as those of example 18 (24.52% NaCl and 15.48% KCl as active agents and PE 735 as the wall material) were incorporated into gum having the following formulation:

| Ingredient | % by weight |
| --- | --- |
| Sugar | 54.9 |
| Stick Base | 19.3 |
| Corn Syrup | 16.8 |
| Dextrose Monohydrate | 7.3 |
| Glycerin | 0.65 |
| Fruit Flavor | 0.8 |
| Fibers | 0.25 |

This gum was chewed by a panel of sensory experts who found that the gum was sweeter in the intermediate chew in addition to longer lasting flavor than a control gum of similar formulation which did not contain gradual release fibers.

Similarly, gradual release fibers made in accordance with the present invention were incorporated into a gum having the following ingredients:

| Ingredient | % by weight |
| --- | --- |
| Stick Base | 25.5 |
| Sorbitol | 44.7 |
| Mannitol | 8.0 |
| Syrup | 9.1 |
| Glycerin | 6.3 |
| Lecithin | 0.2 |
| Brown Color | 0.05 |

| Ingredient | % by weight |
|---|---|
| Mint Flavor | 1.4 |
| Water | 4.05 |
| Fibers | 0.7 |

The syrup consisted of 67% by weight Lycasin solids, 5.36% by weight water, and 27.14% by weight glycerin. The active agent in the gradual release fibers was Aspartame loaded at 33% by weight.

This gum was chewed by a panel of sensory experts and found to have superior sweetness lasting when compared to a control gum of similar formulation that did not contain gradual release fibers.

Chewing gums were prepared having the following general formula:

| Ingredient | % by weight |
|---|---|
| Sugar | 50.76 |
| Base | 20.68 |
| Corn Syrup | 16.86 |
| Dextrose | 10.15 |
| Glycerin | 0.94 |
| Spearmint Flavor | 0.56 |
| Brown Color | 0.05 |

To three gums having the above formula 0.3% by weight Aspartame was added. In the first gum, the Aspartame was contained in gradual release fibers having 25% by weight loading of Aspartame and a wall material consisting of PVAc having a molecular weight of about 15,000. In the second gum, the Aspartame was contained in gradual release fibers having 25% by weight loading of Aspartame and a wall material consisting of 50% (by weight of the total fiber) PVAc having a molecular weight of about 30,000 and 25% (by weight of the total fiber) PVAc having a molecular weight of about 100,000. In the third gum the Aspartame was encapsulated by the encapsulation methods disclosed in U.S. Pat. application Ser. No. 134,948, filed Dec. 18, 1987. A fourth gum of the above formula was prepared to which no Aspartame was added.

Figure 10:
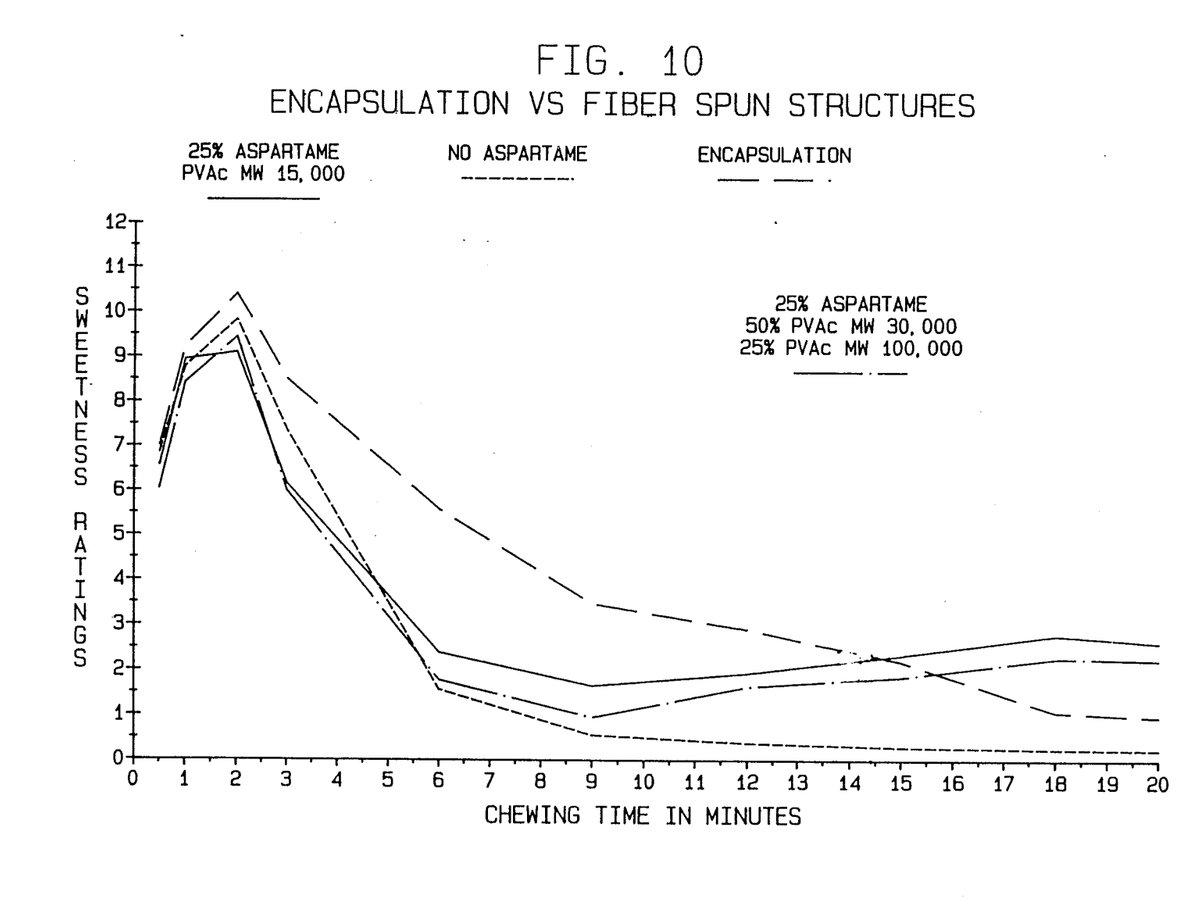
FIG. 10 is a graph showing the differences in sweetness over time between encapsulation and the gradual release structures of the present invention when used in chewing gums.

Ten expert panelists were asked to chew samples of the above four gums and rate the sweetness of each gum over a 20-minute period. Sweetness ratings were taken after the first half minute of chewing, the first full minute of chewing and each full minute thereafter. This data is depicted graphically in FIG. 10. Analysis of this data shows that chewing gums containing gradual release structures exhibited significantly improved sweetness in the final chew when compared to the other two gums. Particularly, the sweetness levels in the gum containing the gradual release structures began to increase after 9 minutes of chewing while the other gums' sweetness was declining. Accordingly, a gum containing both encapsulated sweeteners and gradual release sweeteners could be made to obtain the benefits of both delivery systems in the same gum. The encapsulated sweetener providing sweetness during the initial and intermediate part of the chew and the gradual release structure providing sweetness during the final chew. Additionally, the data in FIG. 10 illustrates the difference in release rate between fibers having different wall material.

Many variations of the invention suggest themselves to those skilled in the art in view of the above disclosure without departing from the spirit and scope of this invention.

I claim:

1. A chewing gum which comprises:
    a gum base;
    a water soluble bulk portion; and,
    a gradual release structure formed by melt spinning a mixture of active agent and spinnable polymeric wall material, having more than zero but less than about 55 percent by weight active agent, into a fiber, and cutting the fiber.

2. The chewing gum of claim 1 in which the fiber is stretched.

3. The chewing gum of claim 1 in which the active agent comprises aspartame.

4. The chewing gum of claim 1 in which the wall material comprises polyvinylacetate having a molecular weight of about 15,000.

5. The chewing gum of claim 1 in which the wall material comprises polyvinylacetate having a molecular weight of about 30,000.

6. The chewing gum of claim 1 in which the wall material comprises polyvinylacetate having a molecular weight from about 50,000 to about 80,000.

7. The chewing gum of claim 1 in which the wall material comprises a blend of polyvinylacetates having molecular weights from about 15,000 to about 80,000.

8. The chewing gum of claim 1 in which the gradual release structure can pass through a 60 mesh screen.

9. The chewing gum of claim 1 in which the active agent comprises a high intensity sweetener.

10. The chewing gum of claim 1 in which the active agent comprises alitame.

11. The chewing gum of claim 1 in which the active agent comprises Acesulfam-K.

12. A process for making chewing gum which comprises the steps of:
    a. preparing a gum base;
    b. preparing a water soluable bulk portion;
    c. preparing a gradual release structure which comprises the steps of:
        i. preparing a mixture of active agent and wall material, having more than zero but less than about 55 percent by weight active agent;
        ii. melt spinning the mixture into a fiber; and
        iii. cutting the fiber; and,
    d. combining the gradual release structure, the gum base and the water soluble bulk portion.

13. The process of claim 12 in which the active agent comprises Aspartame.

14. The process of claim 12 in which the wall material comprises polyvinylacetate having a molecular weight of about 15,000.

15. The process of claim 12 in which the wall material comprises polyvinylacetate having a molecular weight of about 30,000.

16. The process of claim 12 in which the wall material comprises polyvinylacetate having a molecular weight from about 50,000 to about 80,000.

17. The process of claim 12 in which the gradual release structure can pass through a 60 mesh screen.

18. The process of claim 12 in which the wall material comprises a blend of polyvinylacetates having molecular weights from about 15,000 to about 80,000.

19. The process of claim 12 in which the active agent comprises a high intensity sweetener.

20. The process of claim 12 in which the active agent comprises alitame.

21. The process of claim 12 in which the active agent comprises Acesulfam-K.

22. A process for making a chewing gum having a gradual release structure which comprises the steps of:
   preparing a gum base;
   preparing a water soluble bulk portion;
   preparing a mixture of Aspartame and wall material, having from about 10 percent by weight to about 25 percent by weight Aspartame;
   melt spinning the mixture to form a fiber;
   stretching the fiber;
   cutting the fiber; and
   combining the gum base, water soluble bulk portion and gradual release structure.

23. The process of claim 22 in which the wall material comprises polyvinylacetate having a molecular weight of about 15,000.

24. The process of claim 22 in which the wall material comprises polyvinylacetate having a molecular weight of about 30,000.

25. The process of claim 22 in which the wall material comprises polyvinylacetate having a molecular weight from about 50,000 to about 80,000.

26. The process of claim 22 in which the wall material comprises a blend of polyvinylacetates having molecular weights from about 15,000 to about 80,000.

27. The process of claim 22 in which the gradual release structure can pass through a 60 mesh screen.

* * * * *

UNITED STATES PATENT AND TRADEMARK OFFICE
CERTIFICATE OF CORRECTION

PATENT NO. : 4,978,537
DATED : December 18, 1990
INVENTOR(S) : Joo H. Song

It is certified that error appears in the above-identified patent and that said Letters Patent is hereby corrected as shown below:

TITLE PAGE:

IN THE REFERENCES CITED

Under the heading "U.S. Patent Documents" after "3,737,521" please delete "6/1975" and substitute therefor --6/1973--; and after "3,923,939  12/1975  Baker" please insert --et al.--.

IN THE ABSTRACT

In line 4 of the Abstract, please delete "meltspinning" and substitute therefor --melt spinning--.

IN THE BACKGROUND OF THE INVENTION

In column 1, line 34, after "solvents" please insert --.--.

IN THE DETAILED DESCRIPTION OF PRESENTLY
PREFERRED EMBODIMENT OF THE INVENTION

In column 10, line 1, after "by" please insert --weight--.

UNITED STATES PATENT AND TRADEMARK OFFICE
CERTIFICATE OF CORRECTION

PATENT NO. : 4,978,537

DATED : December 18, 1990

INVENTOR(S) : Joo H. Song

It is certified that error appears in the above-identified patent and that said Letters Patent is hereby corrected as shown below:

Column 14

In claim 12, line 4, please delete "soluable" and substitute therefor --soluble--.

Signed and Sealed this

Fifth Day of January, 1993

*Attest:*

DOUGLAS B. COMER

*Attesting Officer*     *Acting Commissioner of Patents and Trademarks*